United States Patent [19]

Rha

[11] Patent Number: 5,494,747
[45] Date of Patent: Feb. 27, 1996

[54] TEXTILE TREATMENT

[75] Inventor: Dong S. Rha, Seoul, Rep. of Korea

[73] Assignee: G B Tools & Components Exports Limited, Manchester, United Kingdom

[21] Appl. No.: 290,758

[22] PCT Filed: Feb. 24, 1993

[86] PCT No.: PCT/GB93/00376

§ 371 Date: Aug. 17, 1994

§ 102(e) Date: /Aug. 17, 1994

[87] PCT Pub. No.: WO93/17173

PCT Pub. Date: Sep. 2, 1993

[30] Foreign Application Priority Data

Feb. 27, 1992 [GB] United Kingdom ............... 9204202

[51] Int. Cl.$^6$ .............. F16D 13/60; D02G 3/02; B32B 13/00; B05D 3/12
[52] U.S. Cl. .............. 428/377; 428/369; 428/66.2; 192/107 M; 427/337; 427/342; 427/389.8; 427/397.8; 156/169; 156/175; 156/180
[58] Field of Search ................ 427/342, 337, 427/413, 434.6, 397.8, 389.8, 178; 428/379, 65, 369, 371, 375, 377; 156/172, 173, 175, 180, 169; 192/107 M

[56] References Cited

U.S. PATENT DOCUMENTS

| | | | |
|---|---|---|---|
| 3,474,616 | 10/1969 | Zeisberg | 427/434.6 |
| 3,766,000 | 10/1973 | Gibson et al. | 427/434.6 |
| 3,818,074 | 6/1974 | Ahlbrecht | 260/486 |
| 3,860,442 | 1/1975 | Natta et al. | . |
| 3,925,281 | 12/1975 | Jorgensen | 260/23 AR |
| 3,936,542 | 2/1976 | Cox | 427/326 |
| 3,984,366 | 10/1976 | Elmer | 156/910 |
| 4,026,856 | 5/1977 | Jahnke | 260/29.4 R |
| 4,045,608 | 8/1977 | Todd | 427/340 |
| 4,118,528 | 10/1978 | Lowry | 427/407.3 |
| 4,185,135 | 1/1980 | Huff | 427/393.3 |
| 4,347,285 | 8/1982 | Batdorf | 427/394 |
| 4,472,243 | 9/1984 | Bondoc et al. | 162/135 |
| 4,632,960 | 12/1986 | Sato et al. | 525/117 |
| 5,098,758 | 3/1992 | Kani | 192/107 M |
| 5,135,780 | 8/1992 | Kissel | 427/408 |
| 5,217,778 | 6/1993 | LaCasso | 192/107 M |

*Primary Examiner*—Diana Dudash
*Attorney, Agent, or Firm*—Nixon & Vanderhye

[57] ABSTRACT

Textile fabrics, yarns and cords are impregnated with rubber, resin and particulate materials by dipping in an aqueous dispersion comprising an aqueous rubber latex, resin and the particulate material, the dispersion further containing a very minor amount of a water-soluble silicate, such as sodium silicate. After drying, the products can be used as reinforcement for mechanical rubber goods and friction materials such as clutch facings and the like.

12 Claims, No Drawings

TEXTILE TREATMENT

This invention relates to the treatment of textile products in the form of fabrics, yarns and cords. It is in particular concerned with the impregnation of such textile products with liquids containing particulate material. In the manufacture of mechanical rubber goods, belting and friction materials including clutch facings, it may be necessary to impregnate a textile product with rubber, resin and inert fillers, the textile product being thereafter incorporated into the finished article, for example by lamination and pressing.

The use of textile products as reinforcements for rubber/resin is well-known. Previously natural fibres were used for this, but it is now common practice to use a glass fibre fabric or strand, usually in admixture with organic fibres such as aromatic polyamides, polyimide, acrylic carbon fibres and/or cellulosic fibres and the like, either as discrete yarns, or more usually in the form of fibre blends. Before incorporation into a finished article by winding, lamination or by other means, it is necessary to impregnate the textile product with rubber and a curable resin together with such particulate fillers as are needed to ensure that conversion into the final article achieves good bonding and satisfactory properties.

Conventional impregnation practice typically requires the use of a solution of the rubber and resin (or resins) in a volatile organic solvent, in which is also dispersed any particulate fillers. The result is a relatively thick, viscous solution/suspension ("dope"). The textile product as a fabric or as a yarn or bundle of parallel yarns is impregnated by drawing it through a bath of this dope, prior to removal of the solvent by passage through a drying tower, or oven. The use of volatile organic solvents is not generally convenient, since they are costly, and the apparatus for handling them demands great care in its use and maintenance, as well as being subject to strict environmental controls.

It is an object of the present invention to provide an impregnation process which does not require the use of organic solvents.

According to this invention, a process for the impregnation of a textile product with a rubber and a resin and particulate filler material comprises the steps of dispersing the particulate filler and the resin in an aqueous rubber latex containing from 0.01% to about 30% by weight of a water-soluble silicate, said amount being based on the total weight of the dispersion, followed by passing the textile product through the aqueous dispersion thus formed.

The process further comprises the step of drying the dipped textile product, optionally after subjecting it to a treatment to at least partially coagulate the latex, for example a passage through an acidic solution, thereby helping to retain the particulate component on and/or within the impregnated textile product. The process is particularly suitable for making rubber and resin impregnated textile yarns or strands, although lengths of fabric, for example narrow fabric, may also be treated.

Particularly preferred rubber latices include carboxylated SBR and NBR; the resin is preferably a phenolic resin. A modified phenolic resin manufactured using an alkali to produce a resol resin is particularly preferred. The resin may also be modified by mixing with cashew nut shell liquid, and/or resorcinol, in known manner.

Surprisingly, it has been found that although the resin and fillers normally promote separation of the latex into an inhomogeneous mix of water and solids, the inclusion of a even very minor proportion of a water-soluble silicate has a significant effect on both the viscosity of the mixture and on its stability. Sodium silicate is particularly preferred and has proved satisfactory when used in amounts as low as 0.01% by weight, again based on the total weight of the dispersion.

The particulate fillers may be of the kind generally used, for example carbon black, barytes and graphite. However, it is also possible to employ a reactive filler system such as a metallic sulphate, for example aluminium sulphate or magnesium sulphate, or a mixture of these, the metallic sulphate reacting with at least some of the water-soluble silicate to yield a precipitate of metallic silicate. It has been found that such a system can in some circumstances improve the stability of the dispersion. Other fillers which may be used include calcium oxide and hollow glass microspheres. The combination of a fine particulate material with a relatively bulky and compressible crushable filler such as microspheres has also been found to be advantageous in some applications.

The impregnated and dried textile product may be processed conventionally. For example, a plurality of superposed impregnated textile layers may be laminated under heat and pressure to form a slab. Likewise, impregnated fabric may be incorporated into a rubber sheet. In another example, several strands may be wound together into a generally flat, annular preform. This preform may then be compression moulded to form a moulded clutch facing, heat and pressure being applied to consolidate/shape the preform and at the same time to partially cure the resin and rubber. After removal of any moulding flash, the moulded facing may be finally cured, usually by baking for several hours, under load. When finally cured, the facing is surface ground, machined to dimensions and, if required, drilled for rivetting to a clutch backing plate.

In order that the invention be better understood, particularly preferred embodiments of it will now be described by way of example with reference to the following table. In the table, three typical formulations are given to illustrate the versatility of the process according to the invention.

TABLE

| Ingredient: | Solid Content % by Weight | (Parts by weight) | | |
|---|---|---|---|---|
| | | Mix 1 | Mix 2 | Mix 3 |
| Aqueous phenolic resol resin | 60.7 | 14.37 | 14.37 | 14.37 |
| Powdered phenolic resol resin | — | — | 4.6 | — |
| Phenolic emulsion resin | 52.5 | 4.6 | — | 4.6 |
| Melamine modified phenolic resin powder | — | 4.00 | 4.00 | 4.00 |
| Petroleum resin (thermoplastic) | — | 0.5 | 0.5 | 0.5 |
| Carboxylated SBR-latex | 49.0 | 16.7 | 16.7 | 16.7 |
| Carbon black | — | 3.7 | 3.7 | 3.7 |
| Sulphur | — | 8.3 | 8.3 | 8.3 |
| Zinc Oxide | — | 2.3 | 2.3 | 2.3 |
| Accelerators (rubber) | — | 0.5 | 0.5 | 0.5 |
| Fine graphite powder | — | 4.0 | 4.0 | 4.0 |
| Barytes | — | 14.2 | 14.2 | 14.2 |
| Magnesium silicate | — | 14.2 | 14.2 | 14.2 |
| Calcium oxide | — | 0.7 | 0.7 | 0.7 |
| Lubricant | — | 2.3 | 2.3 | 2.3 |
| Sodium silicate solution | 50.0 | 0.03 | 0.03 | 0.03 |
| Glass microspheres | — | 4.0 | 4.0 | 4.0 |
| Synthetic flake graphite | — | 4.6 | 4.6 | 4.6 |
| Aluminium powder | — | 1.0 | 1.0 | 1.0 |
| Totals | | 100 | 100 | 100 |

All three mixes were compounded conventionally and transferred to a cord dipping tank. Three ends of a DREF spun glass fibre strand comprising a continuous filament core with cellulose fibres and staple glass fibres on the outside, were passed together through the dipping tank. The dipped/impregnated cords were then passed through a bath containing dilute acetic acid, prior to oven drying and winding up as a single strand. The combined strand was then wound into clutch facing preforms and these preforms were press moulded into clutch facings.

The products were fully comparable with products made by conventional solvent-based impregnation processes, but no solvents were needed. The pick-up of solids from the dipping tank was satisfactory, despite the lack of organic solvent.

I claim:

1. A process for preparing a wound clutch facing comprising the successive steps of:
   (a) dispersing a resin and particulate filler in an aqueous rubber latex containing from 0.01% to about 30% by weight of a water-soluble silicate, said amount being based on the total weight of the dispersion;
   (b) in a single coating step passing a textile yarn through the aqueous dispersion formed in step (a) to impregnate the yarn with the aqueous dispersion;
   (c) preparing a preform clutch facing wound from the impregnated yarn of single coating step (b); and thereafter
   (d) press curing the preform to form a wound clutch facing.

2. The process according to claim 1 wherein the impregnated yarn of step (b) is subjected to a coagulation treatment to at least partially coagulate the latex.

3. The process according to claim 2 wherein the latex is coagulated by treatment with an acidic solution.

4. The process according to claim 1 wherein the impregnated yarn is dried prior to step (c).

5. The process according to claim 1 wherein the water-soluble silicate is sodium silicate.

6. The process according to claim 1 wherein at least some of the particulate filler is constituted by a metallic sulphate which reacts with the water-soluble silicate to yield a precipitate of a metallic silicate.

7. The process according to claim 1 wherein the resin is a phenolic resol, a phenolic resol modified with resorcinol, or a phenolic resol modified with resorcinol and a cashew nut shell liquid resin.

8. The process according to claim 1 wherein the rubber is a carboxylated styrene butadiene rubber latex, nitrile butadiene rubber latex, or mixtures thereof.

9. The process according to claim 1 wherein the textile yarn comprises glass fibers, or mixtures of glass fibers with other inorganic or organic fibers.

10. The process according to claim 9 wherein the textile yarn further comprises cellulose fibers, polyacrylonitrile fibers or both.

11. The process according to claim 1 wherein the textile yarn comprises a bundle of parallel yarns.

12. A wound clutch facing produced by the process of claim 1.

* * * * *